July 29, 1958  M. V. SCHUBERT, JR., ET AL  2,845,193
TRAVELING FEED CART
Filed March 21, 1957
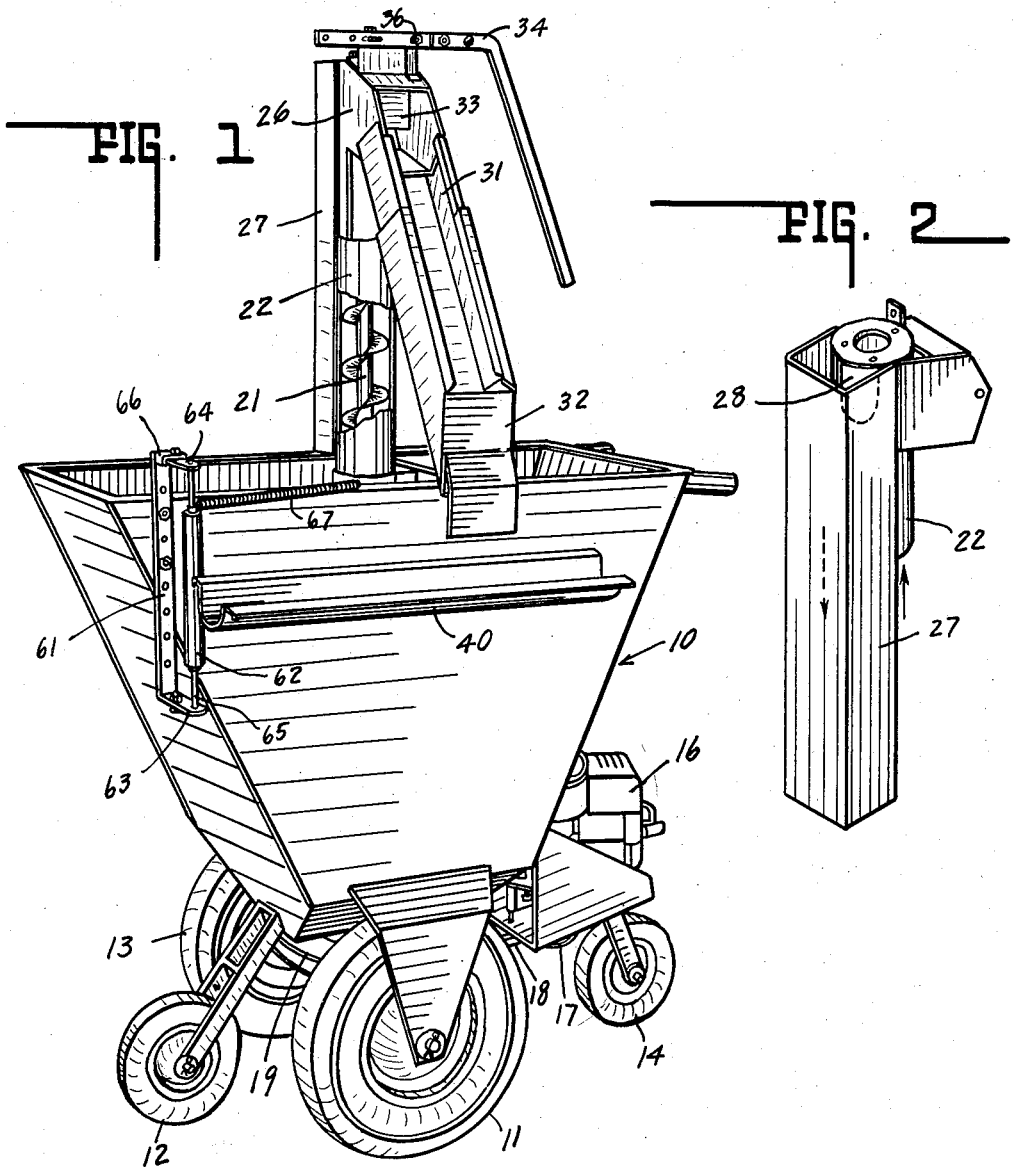
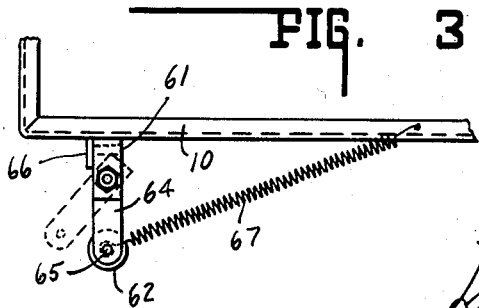
INVENTORS.
MILTON V. SCHUBERT, JR.
JOSEPH B. MANAGO, JR.
BY
Lockwood, Galt, Woodard + Smith
ATTORNEYS.

United States Patent Office 2,845,193
Patented July 29, 1958

2,845,193

TRAVELING FEED CART

Milton V. Schubert, Jr., and Joseph B. Manago, Jr., Columbia City, Ind., assignors to LML Engineering & Manufacturing Corp., a corporation of Indiana Application March 21, 1957, Serial No. 647,623

2 Claims. (Cl. 214—83.18)

This invention relates generally to movable feed carts and particularly to feed carts of the type adapted to intermittently deposit feed along an extending row of feed troughs.

In caring for poultry housed in laying batteries or otherwise housed in extending rows of small cages, it has become customary to utilize a traveling feed cart or hopper which by means of an auger lift arrangement is made to deposit food in the troughs extending in rows along the cages.

Conventionally, the requirement that the poultry feed be deposited only intermittently, at spaced intervals in the troughs has required that the feed dispensing chute be swung from overlying relation to the trough back into overlying relation to the traveling feed cart or that the engine or other driving means for a lift auger be shut off when the dispensing of feed is to be stopped requiring restarting of the auger drive means when the dispensing of feed is to be resumed.

The present invention embodies an apparatus in which a return chute is provided in addition to a feed discharge chute, the return chute being adapted to return feed lifted by the auger back to the feed cart or hopper when a gate controlling the passage of feed through the discharge chute is closed. This arrangement permits intermittent passage of feed through the discharge chute without stopping the auger drive means and without the necessity of swinging the discharge chute backward and forward between the feed troughs and the feed hopper carried by the cart. The present invention further provides a trough edge feeler or guide assembly, one portion of which is adapted to contact the edge of the trough in which feed is to be deposited as the cart is moved along the trough, the assembly being characterized by a limited displacement of the feeler member which makes possible realignment of the feed cart by the operator with respect to the troughs should a mis-alignment occur as the feed cart is pushed along the trough rows. These and other objects will become apparent as the description proceeds with reference to the accompanying drawings in which:

Figure 1 is a perspective view of a feed cart embodying the present invention with parts broken away to more clearly illustrate the operation thereof.

Figure 2 is a perspective detail view of a portion of the apparatus shown in Figure 1.

Figure 3 is a detail of a further portion of the apparatus shown in Figure 1.

Referring initially to Figure 1, there is shown generally at 10 a feed hopper adapted to be carried by wheels 11, 12, 13 and 14, appropriately mounted on the base of the hopper 10. The base of the hopper 10 additionally carries a conventional power means in the form of a gasoline engine 16, having a power output shaft and a drive pulley 17, which by means of a belt 18 rotates a driven pulley 19. The engine 16 has conventional clutch connection (not shown) to drive pulley 17 which engages when the engine speed reaches approximately 1750 R. P. M. A suitable hand throttle (not shown) for control of engine 16 may also be provided.

Journaled in conventional fashion in the base of the hopper 10 is an auger shaft 21 rotated by the pulley 19 and adapted to lift feed in granular form upwardly through the auger lift tube 22 extending upwardly above the hopper 10. The auger lift tube 22 terminates at its upper end in a distributing chamber 26 which at its top appropriately journals the upper end of the auger shaft 21. As will be evident from Figure 2, the tube 22 has joined in side by side relation thereto a return chute 27 generally square in cross-section and adapted to provide a passage for return of feed lifted through the tube 22 back to the feed hopper. This feed return is made possible by the cut-out portion 28 in the upper sidewall of the tube 22 which permits passage of feed lifted by the auger into the return chute 27. Attached to the side walls of the distributing chamber 26 is a discharge chute 31 which may be formed in two or more sections and thereby adjustably extensible. The lower end of the discharge chute carries a feed directing member 32 and is adapted to deposit feed into poultry cage troughs as shown at 40 in Figure 1, the extensibility of the discharge chute 31 permitting accommodation of the cart to troughs of various heights. Feed entry into the discharge chute 31 is controlled by a gate 33 which, by means of a pin and slot connection to a manual operating arm 34, pivotally mounted at 36, may be manually opened and closed. It will be noted that the lower edge of the opening 28 is spaced somewhat above the entry to the discharge chute 31 and that, therefore, when the gate is opened all of the feed raised through the lift tube 22 will be directed through the discharge chute and feed will rise to the level of the opening 28 only when the gate 33 is closed.

In operation, with the hopper filled with the appropriate form of poultry feed and with the engine 16 in operation, feed will be lifted up through the auger lift tube 22 and, with gate 33 closed, the feed will be returned to the hopper through the return chute 27. By means of the handles 41, the operator may now push the feed chart along the trough rows and can intermittently deposit feed in the troughs by operating arm 34 to open and close the gate 33. The feeding of material to the troughs may thus be accomplished intermittently without shutting down or unclutching the power means 16 and without swinging the discharge chute 31 with relation to the troughs.

The trough edge feeler assembly comprises a U-shaped bracket 61 which may be secured by any suitable means to outer face of the hopper sidewall and is adapted to receive in pivotal engagement therewith a second U-shaped member formed by a roller 62 rotatably journaled on a shaft 65 which is rigidly supported by members 63 and 64, which are, in turn, pivoted on the extending legs of the bracket 61. As may best be seen in Figure 3, the upper extending arm of the bracket 61 carries a flange 66 which is adapted to cooperate with the member 64, limiting its motion in a counterclockwise direction as viewed in Figure 3, the assembly formed by roller 62 and members 63 and 64 being urged in such counterclockwise direction by a tension spring 67 having one end fastened to the shaft 65 and its other end anchored at an appropriate point on the hopper sidewall. In operation, the roller 62 is adapted to traverse the edge of the trough as the cart is pushed therealong and should the cart become misaligned with the trough row causing the cart to become wedged thereagainst, the swivel action or displacement of the roller 62 permitted by the spring 67 will allow the cart to be backed away from the trough in a much shorter distance and with less force exerted on the feed trough than would be the case if the mounting for roller 62 were rigid. This swiveling action of the guide assembly thus avoids deformation or bending of the outer edges of the feed trough. If the guide assembly or feeler arrangement provided by roller 62 were rigid, it would require that the operator either force the feed trough into displaced or deformed position as he attempted to back the cart away for realigning or else the operator would have to pull the cart backward a considerable distance at a small angle to establish a new alignment of the cart and trough.

From the foregoing it will be apparent that the present invention provides a convenient and trouble free apparatus for servicing of extending rows of poultry cage troughs and that while modifications might be made to the preferred embodiment described herein, the invention is to be limited only by the appended claims.

What is claimed is:

1. In a traveling device for intermittently depositing feed in a receptacle, a feed hopper, a stationary feed lift tube extending vertically above the hopper, a feed-lifting auger adapted to lift feed from the hopper to the upper extremity of the lift tube, power means carried on the traveling device having driving connection with said feed-lifting auger, a stationary feed discharge chute mounted on the upper terminus of the lift tube, said discharge chute depending angularly from the lift tube and terminating laterally beyond the margin of the hopper, a feed return chute mounted in side-by-side relation to the lift tube and terminating in overlying relation to the hopper, said lift tube having a first opening therein communicating with the discharge chute and a second opening therein spaced above the first opening communicating with said return chute, and a manually operable gate movably supported at the junction of the lift tube and the discharge chute, said gate cooperating with the discharge chute for selectively depositing the feed lifted through said tube into either the return chute or the discharge chute depending on the operative position of said gate, and yieldable means carried on said hopper adapted to engage the receptacle to properly position the terminus of the discharge chute with relation thereto.

2. In a traveling feeder cart having an angularly extending feed discharge chute adapted to deposit feed into an elongated feeding trough, means for transferring feed from the cart to the discharge chute, and cart guide means comprising a bracket carried by the cart and pivotally mounting a roller member adapted to have rolling engagement with a portion of the feeding trough as the cart travels therealong, and a spring cooperating with the pivotal mounting of said roller member to permit horizontal pivotal displacement of the roller member in one direction against the force exerted by the spring to facilitate alignment of the cart with the trough.

References Cited in the file of this patent

UNITED STATES PATENTS

| 1,709,400 | Hess | Apr. 16, 1929 |
| 2,048,877 | McCrery | July 28, 1936 |
| 2,767,963 | Ringen et al. | Oct. 23, 1956 |

FOREIGN PATENTS

| 146,382 | Australia | May 7, 1952 |